Dec. 4, 1945.   S. W. THOMPSON   2,390,228
TRANSMISSION GEARING
Filed Jan. 30, 1943
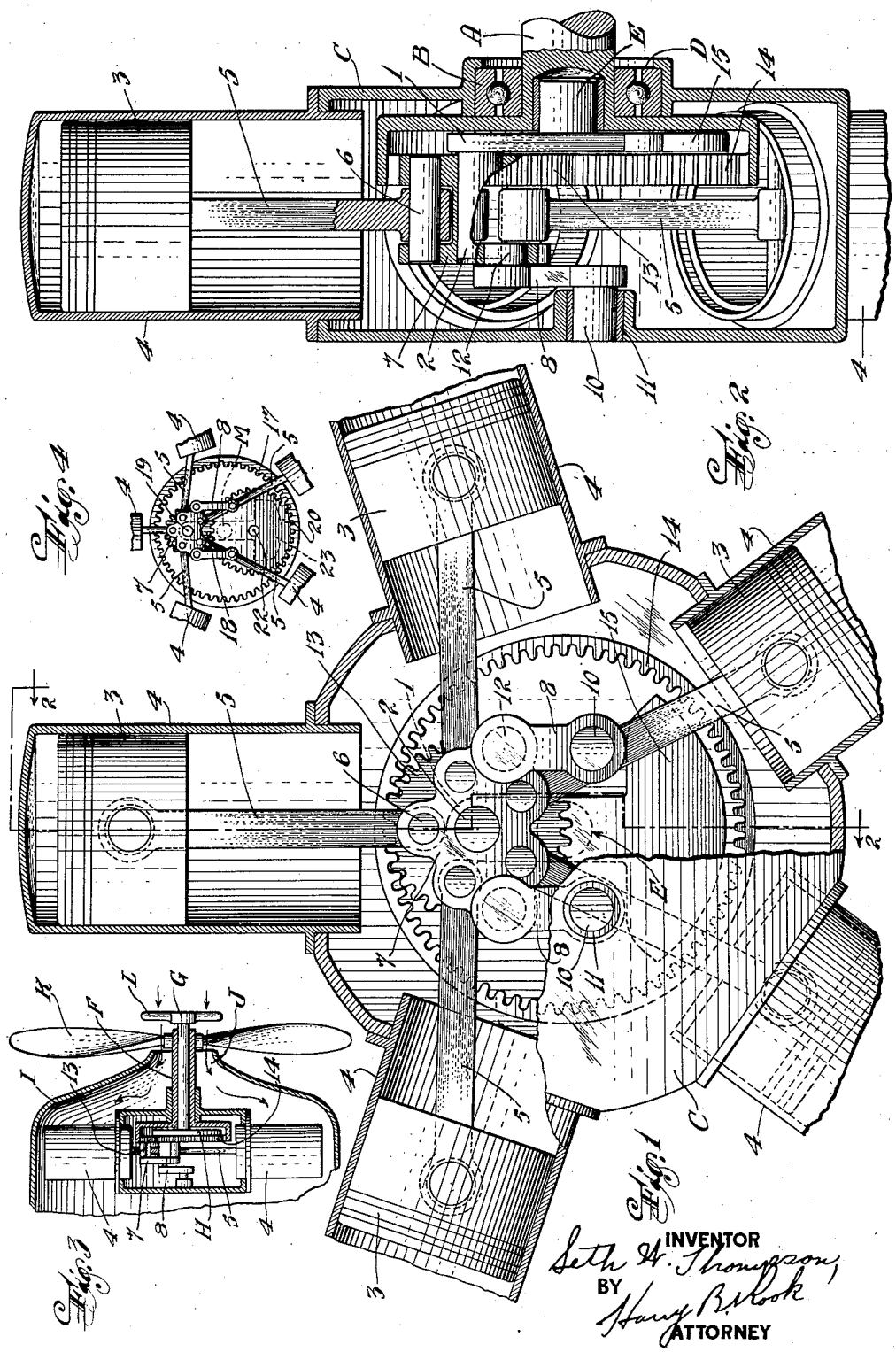

Patented Dec. 4, 1945

2,390,228

UNITED STATES PATENT OFFICE 2,390,228

TRANSMISSION GEARING

Seth W. Thompson, Essex Fells, N. J.

Application January 30, 1943, Serial No. 474,087

13 Claims. (Cl. 74—52)

This invention relates in general to transmission gearing, one object of the invention being to transmit power and motion between one shaft and a crankpin on another shaft through gears one of which shall be mounted directly on the crankpin for relative rotation of said gear and said crankpin about the axis of the latter, whereby the transmission gearing shall be compact, light in weight, smooth-running and reliable.

My invention is especially adapted for use in radial engines of the type that have a rotary drive shaft connected by a crank and connecting or piston rods to pistons that are reciprocable in stationary cylinders arranged in radial relation to said shaft, so that power and motion can be transmitted from the crankpin of said crank to a shaft to be driven, for example an aeroplane propeller shaft, and the transmission gearing may be utilized for driving the driven shaft at either a lower or a higher speed than that of said drive shaft.

In certain engines of this type, all of the connecting rods are attached by knuckle pins to a cluster bearing that is mounted on a plurality of pins which are carried by cranks or links mounted to revolve so that the throws of said cranks or links are always equal and parallel, whereby when said cranks or links revolve said cluster bearing moves bodily in a circular path and consequently the movements of said pistons are symmetrical. A crankpin which may be one of the aforementioned pins, is connected to said cluster bearing for relative rotation of said bearing and said crankpin about the axis of the latter.

Therefore, another object of my invention is to provide a novel and improved transmission gearing for transmitting power and motion from said cluster bearing to another shaft which is to be driven, which shall comprise a minimum number of simple and relatively inexpensive parts and which will reliably operate with a minimum of frictional resistance and vibration.

A further object is to provide a novel and improved construction, combination and arrangement of said cluster bearing and said transmission gearing such that all parts thereof can be compactly located within a crank case of the size and general type usually found in engines of the general character described, whereby the engine may be relatively small and simple in design.

Another object is to provide a transmission gearing of the character described wherein the crankshaft and the driven shaft shall be telescopically associated, whereby for example the driven shaft may rotate one device, for example an aeroplane propeller, while the crankshaft may drive another device exterior of the engine, for example a fan for blowing air over the engine cylinders to cool them.

Other objects, advantages and results of the invention will be brought out by the following description in conjunction with the accompanying drawing in which Figure 1 is a fragmentary schematic end elevational-vertical sectional view through an internal combustion engine of the radial type that embodies a transmission gearing constructed in accordance with the invention.

Figure 2 is an enlarged transverse vertical sectional view on the line 2—2 of Figure 1, Figure 3 is a vertical sectional view similar to Figure 2 on a reduced scale illustrating a modification of the invention, and Figure 4 is a fragmentary view similar to Figure 1, on a reduced scale, showing another modification of the invention.

For the purpose of illustrating the principles of the invention I have shown it in conjunction with an engine of the aeronautical type which includes a crank shaft, and a plurality of cylinders arranged radially relatively to the shaft and disposed in a common plane. For simplicity in illustration some of the cylinders have been omitted.

In the drawing the engine is shown as including a shaft A, specifically a shaft that is to be driven, which is journaled in a suitable bearing B in a crank case C. More specifically the shaft A might be the propeller shaft of an airplane.

Journaled coaxially with the shaft A, and more specifically journaled within a bearing D in the end of the shaft A that is disposed within the crank case C, is a crank shaft E which has a crank 1 provided with a crank pin 2.

The crank pin 2 is connected to pistons 3 in the cylinders 4 by piston or connecting rods 5 which are connected by knuckle pins 6 to a cluster bearing member 7 which is journaled on the crank pin to permit relative rotation of the bearing member and crank pin about the axis of the latter. As shown, the bearing member 7 and crank pin 2 are coaxial and upon rotation of the crank shaft E the bearing member must be moved bodily in a circular path the center of which is colinear with the axis of rotation of the crank shaft E. The bearing member 7 is held against rotation during bodily movement thereof by the crank pin by a plurality of crank-like members 8, each of which has a stud 10 journaled in a bearing 11 in the crank case and another stud 12 which is pivotally connected to the bearing member 7. The throws of the crank 1 and the crank-like members 8 are always equal and parallel so that the bearing member 7 may rotate in a circular path as above described, but at the same time will be held against rotation. Therefore, every point on the bearing member 7 will rotate in a circular path about an imaginary center.

The bearing member has fast-connected thereto, as by integral formation, a gear 13 which meshes with an internal or ring gear 14 which is fast-connected to and is coaxial with the driven shaft A.

With this construction, as the crank shaft E is rotated by the force of explosions in the cylinder 4, the driven shaft A will be driven by the gear 13 which meshes with the ring gear 14.

Due to the relative sizes of the gears 13 and 14 the speed of rotation of the shaft A will be less than that of the crank shaft E and by proper relationship of the sizes of the gears, any desired speed-reducing ratio between the crank shaft and the driven shaft may be obtained.

If desired, in order to ensure smooth operation of the transmission gearing, a counterweight 15 may be mounted on the crank shaft in counterbalancing relation to the crank 1, as usual.

A modification of the invention is shown in Figure 3 wherein the driven shaft F, corresponding to the shaft A, is tubular and the crank shaft G, corresponding to the shaft E, extends through the shaft F and has the crank H, corresponding to the crank 1, at the inner end of the shaft F. The engine is surrounded by a cowl or hood I which has an opening J in the forward end thereof. A propeller K is mounted on the shaft F outside the cowl, and a fan L is mounted on the portion of the crank shaft G which projects from the shaft F at the end of the latter opposite the crank H so that the fan when the shaft G is rotated will force air through the opening J and into the cowl or hood I around the engine cylinders to cool the latter. With this construction it will be noted that both the driven shaft F and the crank shaft G may be operatively connected to various devices to be driven, such as the propeller K and the fan L.

It will also be understood that if the ring gear 14 were replaced by a smaller gear having external teeth in combination with a correspondingly smaller gear in place of the gear 13, the driven shaft A might be rotated at either a higher or a lower speed than that of the crank shaft, depending upon the gear ratio, and in the reverse direction.

Furthermore it is possible, and under some conditions may be desirable, to provide a gear-connection between the crank shaft and the gear on the driven shaft, wherein the gear on the crank pin does not mesh directly with said driven gear. For example, a train of gears may be interposed between the crankpin and the driven gear.

One such modification of my invention is shown in Figure 4 where the gear connection between the crank shaft M and the gear 17 that corresponds to the gear 14, comprises a gear 18 on the crank pin 19 which does not mesh directly with the gear 17 but instead meshes with a gear 20 which meshes with the gear 17 and is mounted to revolve on a pin 22 which is secured on the counterbalance arm 23 of the crank.

Other modifications and changes in the details of construction of the invention will occur to those skilled in the art as within the spirit and scope of the invention.

What I claim is:

1. The combination of a rotatable gear, a crankshaft having a crankpin, a second gear meshing with said rotatable gear and mounted on said crankpin to permit relative movement of said second gear and said crankpin about the axis of the latter, and crank-like members for holding said second gear against rotation and for guiding it so that every point thereon moves in a circular path.

2. The combination of a support, a first shaft journalled for rotation in said support, a first gear fast-connected to said shaft, a crank shaft journaled coaxially with said first shaft and having a crankpin, a second gear meshing with said first gear and mounted on said crankpin for relative rotation of said second gear and said crankpin about the axis of the latter, and crank-like members for holding said second gear against rotation during bodily movement thereof by said crankpin so that every point thereon moves in a circular path.

3. The combination of a support, a first gear rotatably mounted thereon, a crankshaft journaled coaxially with said first gear and having a crankpin, a second gear meshing with said first gear and connected to said crankpin coaxially therewith so that said second gear will be moved bodily by rotation of said crankshaft, and crank-like members connected between said support and said second gear to guide the latter for movement so that every point on said second gear moves in a circular path.

4. The combination of a support, a first shaft journaled for rotation in said support, a first gear fast-connected to said shaft, a crankshaft journaled coaxially with said first shaft and having a crankpin, a second gear meshing with said first gear and mounted on said crankpin for relative rotation of said second gear and said crankpin about the axis of the latter, and means for holding said second gear against rotation during bodily movement thereof by said crankpin so that every point on said second gear moves in a circular path, said first shaft being tubular and said crankshaft extending therethrough whereby each of said first shaft and said crankshaft may be utilized for driving purposes.

5. The combination of a support, a gear journaled for rotation on said support, a crankshaft journaled on said support coaxially with said gear and having a crank, and a gear connection between said crankshaft and said gear including another gear mounted for revolution about an axis on said crank and movable bodily by said crank so that its axis travels in a circular path whose center is colinear with the axis of the first-mentioned gear, and crank-like members to hold the last-mentioned gear against rotation about its axis on said crank.

6. The combination of a support, a gear journaled for rotation on said support, a crankshaft journaled on said support coaxially with said gear and having a crank, and a gear connection between said crankshaft and said gear including a plurality of intermeshing gears mounted on said crank for revolution relatively thereto about individual axes parallel to the axis of said shaft and movable bodily by said crank such that their axes travel in circular paths whose centers are colinear with the axis of the first-mentioned gear, at least one of said plurality of gears being journaled on said crank pin, and means for holding at least one of said plurality of gears against rotation about its axis.

7. The combination of a support, a gear journaled for rotation on said support, a crankshaft journaled on said support coaxially with said gear and having a crankpin, and a gear connection between said crankshaft and said gear including a second gear mounted on said crankpin for relative movement of said second gear and said crankpin about the axis of the latter, means for preventing rotation of said second gear about said axis, and at least one other gear mounted for revolution on said crank and connecting said second gear to the first-mentioned gear.

8. The combination of a support, a first shaft journaled for rotation in said support, a first gear fast-connected to said shaft, a crankshaft journaled coaxially with said first shaft and having a crankpin, a second gear meshing with said first gear and mounted on said crankpin for relative rotation of said second gear and said crankpin about the axis of the latter, and means for holding said second gear against rotation during bodily movement thereof by said crankpin in a circular path whose center is colinear with the axis of rotation of said first shaft.

9. The combination of a support, a gear journaled for rotation on said support, a crankshaft journaled on said support coaxially with said gear and having a crank, and a gear connection between said crankshaft and said gear including at least another gear mounted for revolution about an axis on said crank parallel to the axis of said crankshaft and movable bodily by said crank so that its axis travels in a circular path whose center is colinear with the axis of the said crankshaft and said first-mentioned gear, and means to hold the last-mentioned gear against rotation about its axis on said crank.

10. The combination of a support, a gear journaled for rotation on said support, a crankshaft journaled on said support coaxially with said gear and having a crankpin, and a gear connection between said crankshaft and said gear including a plurality of intermeshing gears mounted on said crank for revolution relatively thereto about individual axes and movable bodily by said crank in circular paths whose centers are colinear with the axis of the first-mentioned gear, at least one of said plurality of gears being journaled on said crank pin, and at least one thereof meshing with said first-mentioned gear, and means for holding at least one of said plurality of gears against rotation about its axis.

11. In mechanism for effecting curvilinear translation of motion, the combination with a reciprocable member, and a rotatable gear, of a second gear meshing with said rotatable gear, means mounting said second gear for bodily movement such that its axis travels in a circular path, a link pivotally connected to said reciprocable member and pivotally connected eccentrically to said second gear for transmitting motion between said reciprocable member and said second gear, and means for holding said second gear against rotative motion in all directions relatively to its axis, so that every point on said second gear travels in a circular path.

12. The combination of a support, a gear journaled for rotation about an axis on said support, a second gear meshing with the first-mentioned gear, and crank-like members journaled in said support and connected to said second gear to permit bodily movement thereof in a circular path whose center is colinear with the axis of rotation of said first-mentioned gear and for holding said second gear against all rotative motion about its axis so that every point on said second gear moves in a circular path.

13. The combination of a support, a gear journaled on a shaft in said support and a gear connection between said shaft and said gear including at least another gear mounted for revolution about an axis on said shaft parallel but eccentric to the axis of said shaft and movable bodily by the shaft so that its axis travels in a circular path whose center is colinear with the axis of the first-mentioned gear, and means other than said first-mentioned gear to hold the last-mentioned gear against rotation about its axis on said shaft.

SETH W. THOMPSON.